United States Patent
Oh et al.

(10) Patent No.: US 9,264,130 B2
(45) Date of Patent: *Feb. 16, 2016

(54) APPARATUS AND METHOD FOR TRANSMITTING FRAME INFORMATION IN MULTI-HOP RELAY BROADBAND WIRELESS ACCESS COMMUNICATION SYSTEM

(75) Inventors: Chang-Yoon Oh, Gyeonggi-do (KR); Hyun-Jeong Kang, Seoul (KR); Jae-Weon Cho, Gyeonggi-do (KR); Hyoung-Kyu Lim, Seoul (KR); Sung-Jin Lee, Seoul (KR); Young-Bin Chang, Gyeonggi-do (KR); Yeong-Moon Son, Gyeonggi-do (KR); Taori Rakesh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 24 days.

This patent is subject to a terminal disclaimer.

(21) Appl. No.: 13/536,392

(22) Filed: Jun. 28, 2012

(65) Prior Publication Data
US 2012/0269114 A1   Oct. 25, 2012

Related U.S. Application Data

(63) Continuation of application No. 11/970,798, filed on Jan. 8, 2008, now Pat. No. 8,233,398.

(30) Foreign Application Priority Data

Jan. 8, 2007 (KR) .................. 10-2007-0002216
Jan. 10, 2007 (KR) .................. 10-2007-0002945
Feb. 8, 2007 (KR) .................. 10-2007-0012979

(51) Int. Cl.
*H04L 12/24* (2006.01)
*H04B 7/26* (2006.01)
*H04B 7/155* (2006.01)

(52) U.S. Cl.
CPC .............. *H04B 7/2606* (2013.01); *H04B 7/155* (2013.01)

(58) Field of Classification Search
CPC ... H04L 5/0053; H04L 5/0007; H04L 5/0048; H04L 1/0025; H04L 1/0057; H04L 1/0071; H04L 27/2608; H04W 74/02
USPC ...................... 370/241, 241.1, 242, 243, 277, 370/310–350
See application file for complete search history.

(56) References Cited

U.S. PATENT DOCUMENTS 5,966,664 A   10/1999   Hiramatsu et al.
6,532,227 B1 *  3/2003   Leppisaari et al. ........... 370/348

(Continued)

FOREIGN PATENT DOCUMENTS

EP   0497490 A2   8/1992
JP   7245578     9/1995

(Continued)

OTHER PUBLICATIONS

Mike Hart et al.: "Frame Structure for Multihop Relaying Support", IEEE 802.16 Broadband Wireless Access Working Group, Nov. 7, 2006.

(Continued)

*Primary Examiner* — Fan Ng
(74) *Attorney, Agent, or Firm* — The Farrell Law Firm, P.C.

(57) ABSTRACT

An upper node is provided for use in a wireless communication system using a relay scheme. The upper node includes means for transmitting, upon a request of a lower relay station for an initial connection of the lower relay station, downlink section information for communication with the lower relay station for a relay service to the lower relay station; and means for transmitting, after the initial connection with the lower relay station, frame configuration information for communication with the lower relay station for a relay service to the lower relay station through the downlink section. The downlink section information includes configuration information of the downlink section for communication with the lower relay station for a relay service.

22 Claims, 10 Drawing Sheets

(56) References Cited

U.S. PATENT DOCUMENTS

| | | |
|---|---|---|
| 8,233,398 B2 * | 7/2012 | Oh et al. .................... 370/241 |
| 2002/0082033 A1 * | 6/2002 | Lohtia et al. .................. 455/517 |
| 2006/0046643 A1 | 3/2006 | Izumikawa et al. |
| 2006/0056341 A1 * | 3/2006 | Takagi et al. ................ 370/328 |
| 2006/0153132 A1 * | 7/2006 | Saito ........................... 370/329 |
| 2007/0076684 A1 * | 4/2007 | Lee et al. ..................... 370/350 |
| 2007/0086388 A1 * | 4/2007 | Kang et al. .................. 370/331 |
| 2007/0104148 A1 * | 5/2007 | Kang et al. .................. 370/331 |
| 2007/0109962 A1 * | 5/2007 | Leng et al. ................... 370/229 |
| 2007/0288607 A1 * | 12/2007 | Hsieh ........................... 709/220 |
| 2008/0002741 A1 * | 1/2008 | Maheshwari et al. ........ 370/473 |
| 2008/0285500 A1 * | 11/2008 | Zhang et al. ................. 370/315 |
| 2009/0036050 A1 * | 2/2009 | Min et al. ......................... 455/7 |

FOREIGN PATENT DOCUMENTS

| | | |
|---|---|---|
| JP | 9327071 | 12/1997 |
| JP | 11234738 | 8/1999 |
| JP | 2006074325 | 3/2006 |
| JP | 2006-303802 | 11/2006 |
| JP | 2006196985 | 7/2008 |

OTHER PUBLICATIONS

IEEE 802.16 Broadband Wireless Access Working Group, Nov. 7, 2006.

* cited by examiner

APPARATUS AND METHOD FOR TRANSMITTING FRAME INFORMATION IN MULTI-HOP RELAY BROADBAND WIRELESS ACCESS COMMUNICATION SYSTEM

PRIORITY

This application is a Continuation of U.S. application Ser. No. 11/970,798, which was filed in the U.S. Patent and Trademark Office on Jan. 8, 2008, and claims priority under 35 U.S.C. §119(a) to applications filed in the Korean Intellectual Property Office on Jan. 8, 2007 and allocated Serial No. 10-2007-0002216, on Jan. 10, 2007 and allocated Serial No. 10-2007-0002945, and on Feb. 8, 2007 and allocated Serial No. 10-2007-0012979, the contents of which are incorporated herein by reference.

BACKGROUND OF THE INVENTION

1. Field of the Invention

The present invention relates generally to a multi-hop relay wireless communication system, and in particular, to an apparatus and method for transmitting frame information from a Base Station (BS) or an upper Relay Station (RS) to a lower RS in a multi-hop relay wireless communication system.

2. Description of the Related Art

In fourth-generation (4G) communication systems, radii of cells are reduced to achieve a higher transmission rate and accommodate a larger number of calls. Centralized network design with conventional technology is not viable for the 4G mobile communication systems. Thus, the 4G mobile communication systems should allow for distributed control and implementation, and cope actively with an environment change, such as addition of a new BS. For this reason, the 4G mobile communication systems should use a self-configurable wireless network.

Technologies used for an ad-hoc network are introduced to the 4G mobile communication systems for deployment of a self-configurable wireless network. A primary example is a multi-hop relay network configured by introducing a multi-hop relay scheme used for the ad-hoc network to a cellular network using fixed BSs.

Since communications are performed between a BS and a Mobile Station (MS) via a direct link, a highly reliable radio communication link can be easily established between them in the cellular network. However, the fixedness of BSs impedes flexible wireless network configuration, which makes it difficult to provide efficient services in a radio environment that experiences a fluctuating traffic distribution and a significant change in the number of calls.

To avert this problem, a relay scheme is adopted in which data is conveyed through multiple hops via neighbor MSs or neighbor RSs. A multi-hop relay scheme facilitates fast network reconfiguration adaptive to an environmental change and renders an overall wireless network operation efficient.

Also, the multi-hop relay scheme can provide an improved radio channel quality to an MS by installing an RS between the BS and the MS and thus establishing a multi-hop relay path via the RS. In addition, the multi-hop relay scheme can expand cell coverage because it can provide high-speed data channels to MSs in a cell boundary area where channel conditions from the BS are poor.

FIG. 1 illustrates the configuration of a wireless communication system using a conventional relay scheme.

Referring to FIG. 1, a first MS (MS1) 110, which is located within a service area (i.e., coverage) 101 of a BS 100, communicates with the BS 100 via a direct link. A second MS (MS2) 120, which is located outside the service area 101 of the BS 100 and thus is in poor channel condition, communicates with the BS 100 via a relay link of an RS 130.

That is, using the RS 130, the BS 100 can communicate with MSs that are in a poor channel condition because they are located outside the service area 101 of the BS 100 or in a shadowing area experiencing severe shielding effects from buildings.

In order to support a relay link using RSs, the wireless communication system using a relay scheme must perform communication using a structure illustrated in FIG. 2, which particularly is a frame structure for a wireless communication system using a conventional relay scheme.

Referring to FIG. 2, the frame is divided into a DownLink (DL) subframe 200 and an UpLink (UL) subframe 230. The DL/UL subframe 200/230 is divided into a first section 210/240 for a direct link service and a second section 220/250 for a relay link service.

The first section 210 of the DL subframe 200 includes a BS preamble channel 211, a control channel 213, and a traffic channel 215, for transmission from the BS through a direct link to an RS and an MS.

The second section 220 of the DL subframe 200 includes an RS preamble channel 221, an RS control channel 223, and an RS traffic channel 215, for transmission from the RS through a relay link to an MS.

The first section 240 of the UL subframe 230 is used to transmit control information and traffic data from the RS and the MS, which is connected through a direct link, to the BS. The second section 250 of the UL subframe 230 is used to transmit control information and traffic data from the MS, which is connected through a relay link, to the RS.

As described above, in order to support a relay scheme, the wireless communication system performs communication using the frame structure illustrated in FIG. 2. However, the frame structure of FIG. 2 supports only two-hop wireless communication systems because it has no section for RS-RS communication. Thus, the wireless communication system using a relay scheme needs a frame structure for supporting a multi-hop relay service.

SUMMARY OF THE INVENTION

The present invention is designed to substantially solve at least the above-described problems and/or disadvantages and to provide at least the advantages below.

Accordingly, an aspect of the present invention is to provide an apparatus and method for a frame structure for supporting a multi-hop relay service in a wireless communication system.

Another aspect of the present invention is to provide an apparatus and method for transmitting frame information from a BS to an RS in a multi-hop relay wireless communication system.

Another aspect of the present invention is to provide an apparatus and method for transmitting frame information from an upper RS to a lower RS in a multi-hop relay wireless communication system.

In accordance with an aspect of the present invention, an upper node in a wireless communication system using a relay scheme is provided. The upper node includes means for transmitting, upon a request of a lower relay station for an initial connection of the lower relay station, downlink section information for communication with the lower relay station for a relay service to the lower relay station; and means for transmitting, after the initial connection with the lower relay station, frame configuration information for communication with the lower relay station for a relay service to the lower relay station through the downlink section. The downlink section information includes configuration information of the downlink section for communication with the lower relay station for a relay service.

In accordance with another aspect of the present invention, a relay station is provided in a wireless communication system using a relay scheme. The relay station includes means for acquiring, at an initial connection with an upper node of the relay station, downlink section information for communication with the upper node for a relay service from the upper node; and means for acquiring, after the initial connection with the upper node, frame configuration information for communication with the upper node for a relay service through the downlink section information. The downlink section information includes configuration information of a downlink section for communication with the lower relay station for the relay service.

In accordance with an aspect of the present invention, an upper node in a wireless communication system using a relay scheme is provided. The upper node includes means for generating a control message including uplink section information for communication with a lower relay station for a relay service, in a format of one of a Downlink Channel Descriptor (DCD), a Media Access Control (MAC) message, and a Media Access Protocol (MAP) message including uplink section information in a format of an information element; and means for transmitting the control message to the lower relay station; and means for communicating with the lower relay station using the frame configuration information transmitted to the lower relay station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS OF THE INVENTION

Various embodiments of the present invention will be described herein below with reference to the accompanying drawings. In the following description, well-known functions or constructions are not described in detail for the sake of clarity and conciseness.

The present invention provides schemes for transmitting frame information from an upper node to a lower RS in a multi-hop relay wireless communication system. Herein, the upper node indicates a BS or an upper RS.

The following description is made in the context of a Time Division Duplex-Orthogonal Frequency Division Multiple Access (TDD-OFDMA) wireless communication system, to which the present invention is not limited. Thus, it is to be clearly understood that the present invention is applicable to any other multiple access wireless communication system.

Figure 1:
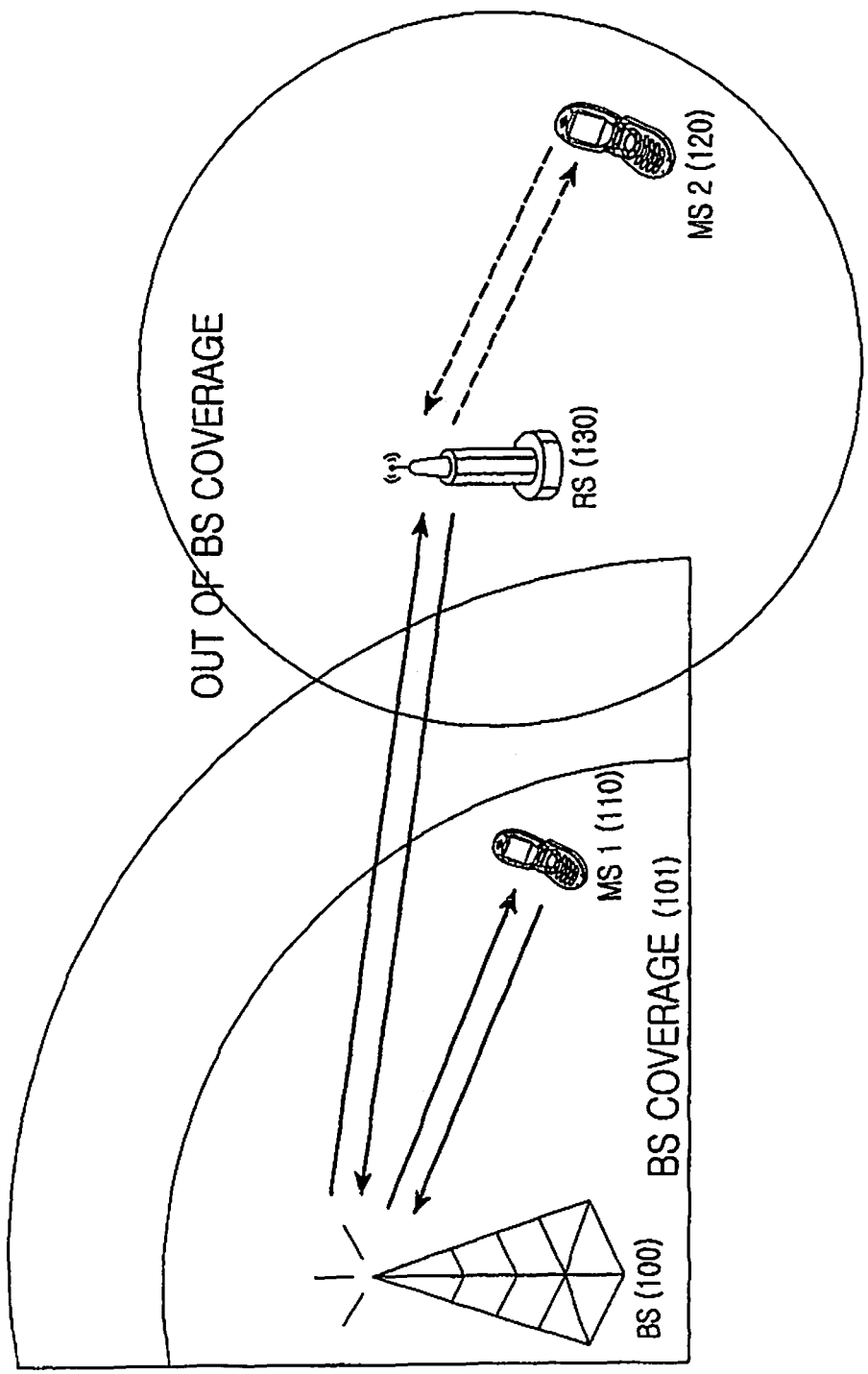
FIG. 1 illustrates the configuration of a wireless communication system using a conventional relay scheme.
Figure 2:
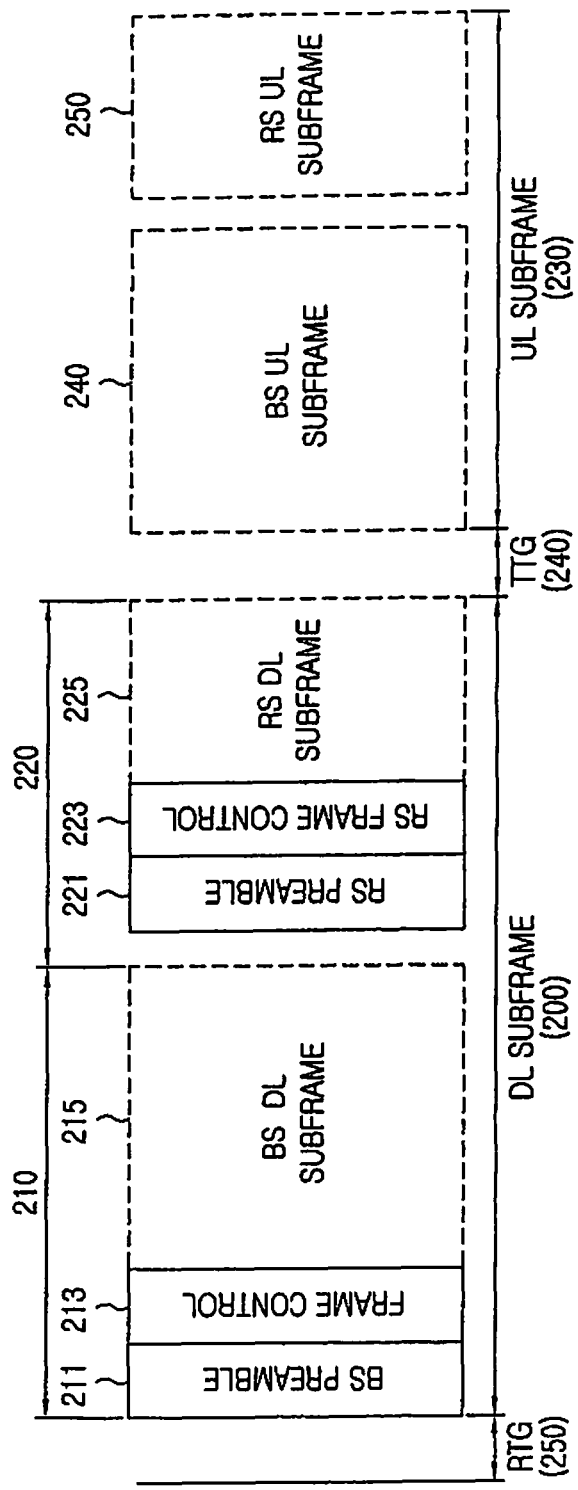
FIG. 2 illustrates a frame structure for a wireless communication system using a conventional relay scheme.
Figure 3:
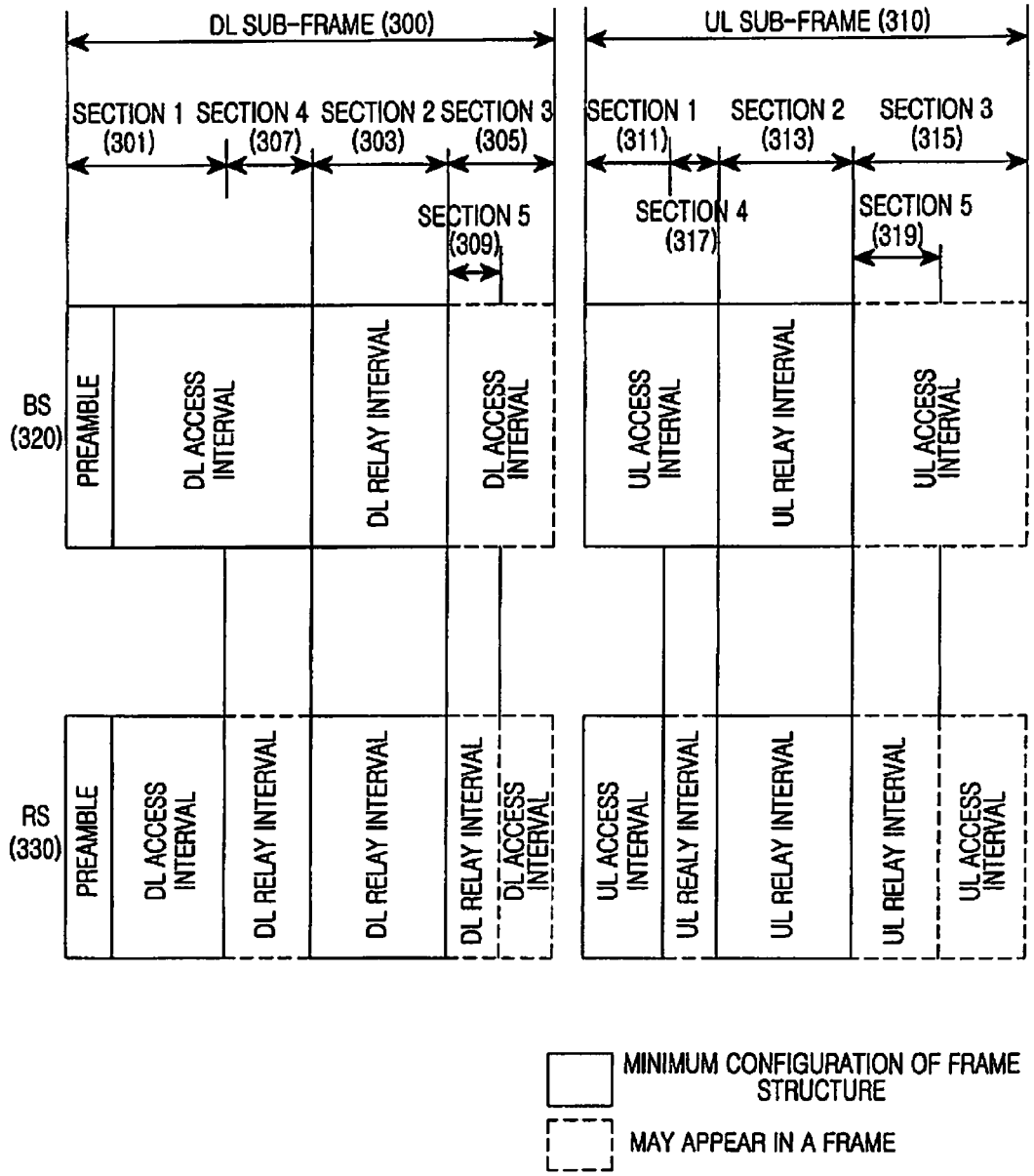
FIG. 3 illustrates a frame structure of a multi-hop relay wireless communication system according to an embodiment of the present invention.

In order to support a multi-hop relay service, the wireless communication system performs communication using a frame structure illustrated in FIG. 3. However, it is to be clearly understood that the present invention is applicable to any other frame structure.

FIG. 3 illustrates a frame structure of a multi-hop relay wireless communication system according to the present invention.

Referring to FIG. 3, the frame includes a DL subframe 300 and a UL subframe 310.

When the wireless communication system uses two hops, the DL/UL subframe 300/310 is divided into a first section 301/311 and a second section 303/313. There is a fourth section 307/317 between the first section 301/311 and the second section 303/313. However, when the wireless communication system uses two hops, there is no fourth section 307/317. Accordingly, the first section 301/311 and the second section 303/313 may extend to the fourth section 307/317. In the first section 301/311, a BS and an RS communicate with MSs within their coverage. In the second section 303/313, the BS communicates with the RS.

When the wireless communication system supports a real-time service, the RS must relay a signal in one frame in order to reduce a transmission delay. Thus, the DL/UL subframe 300/310 is divided into a first section 301/311, a second section 303/313, and a third section 305/315. In the first section 301/311 and the third section 305/315, a BS and an RS communicate with MSs within their coverage. In the second section 303/313, the BS communicates with the RS. That is, on the downlink, the RS receives data from the BS in the second section 303. Thereafter, in the third section 305, the RS relays data, which is received from the BS in the second section 303, to MSs within its coverage.

As described above, the subframe may be divided into three sections by adjusting the sizes of the two sections in the subframe divided into the two sections. Alternatively, the subframe may be divided into three sections by adding the third section in the subframe divided into the two sections.

When the wireless communication system uses three or more hops, the subframe must include a section for inter-RS communication (i.e., communication between RSs, such as between an upper RS and a lower RS). Thus, a section for inter-RS communication is located before or after the second section 303/313.

When the section for inter-RS communication is located before the second section 303/313, the DL/UL subframe 300/

310 includes a first section 301/311, a second section 303/313, and a fourth section 307/317. In the first section 301/311, a BS and an RS communicate with MSs within their coverage. In the second section 303/313, a BS communicates with an RS. In the fourth section 307/317, an upper RS communicates with a lower RS and a BS communicates with MSs within its coverage.

When the section for inter-RS communication is located after the second section 303/313, the DL/UL subframe 300/310 includes a first section 301/311, a second section 303/313, and a fifth section 309/319. In the first section 301/311, a BS and an RS communicate with MSs within their coverage. In the second section 303/313, a BS communicates with an RS. In the fifth section 309/319, an upper RS communicates with a lower RS and a BS communicates with MSs within its coverage. In this case, the fifth section 309/319 may be added after the second section 303/313.

Also, three or more relay-service sections (i.e., sections for a relay service) may be located in the subframe. For example, for a relay service, the second section 303 for communication between a BS and an RS and the fourth and fifth sections 307 and 309 for communication between RSs may be located in the DL subframe 300. The following description is made on the assumption that the subframe includes three relay-service sections. However, it is to be clearly understood that the subframe may include three or more relay-service sections.

In the first section 301/311, a BS and an RS communicate with MSs within their coverage. In at least one of the second section 303/313, the fourth section 307/317, and the fifth section 309/319, the BS communicates with a 1-hop RS. At this point, RSs perform inter-RS communications using the others of the second section 303/313, the fourth section 307/317, and the fifth section 309/319 that are not used for communication with the BS. In this case, the RS may not provide any service in some of the second section 303/313, the fourth section 307/317, and the fifth section 309/319. That is, in order to reduce an inter-RS interference caused by the reuse of a relay section, some RSs may be set to an idle mode in some of the sections to provide no service.

When the wireless communication system using three or more hops supports a real-time service, an RS must relay a signal in one frame in order to reduce a transmission delay. Thus, the DL/UL subframe 300/310 is divided into a first section 301/311, a second section 303/313, a third section 305/315, and a fourth section 307/317 or a fifth section 309/319 for inter-RS communication. Herein, the fifth section 309/319 may be included in the third section 305/315.

In the DL subframe 300 of the above-described frame structure, a synchronization (sync) channel may be located at the start or end of each of relay-service sections. Herein, the relay-service sections are the second section 303, the third section 305, the fourth section 307, and the fifth section 309.

When a BS or an upper RS transmits information about the location of a sync channel using control information (e.g., DL Media Access Protocol (DL MAP)), the sync channel may be located at the center of each of the relay-service sections.

Also, the BS and the upper RS may include a control message, such as a MAP for indicating resource allocation information and a Frame Control Header (FCH) for informing the configuration information of the MAP, in the relay-service sections.

In this case, the BS and the upper RS may include the sync channel and the control message in all of the relay-service sections. Alternatively, the BS and the upper RS may include the sync channel and the control message only in some of the subframe sections.

The following description will be given of a communication scheme using the above-described frame structure in the wireless communication system.

First, a description will be given of a method for performing communication in the wireless communication system using the subframe including two relay-service sections. In the following description, it is assumed that the second section 303/313 and the fourth section 307/317 are used as the two relay-service sections. However, it is to be clearly understood that the second section 303/313 and the fifth section 309/319 can also be used as the two relay-service sections. Also, it is assumed that the wireless communication system includes the third section 305/315 so that the RS can support a relay service in one frame.

Figure 4:
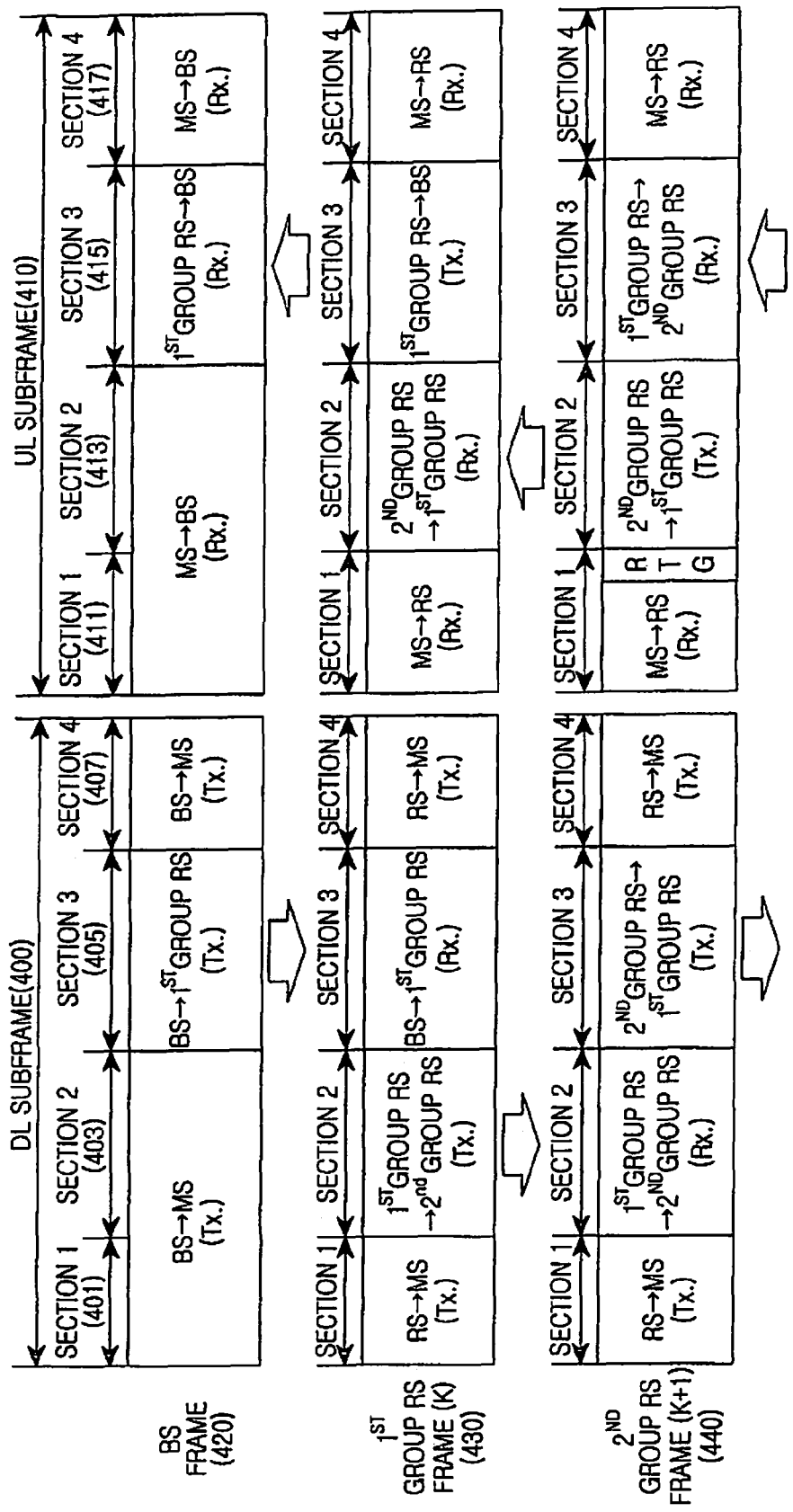
FIG. 4 illustrates a communication procedure using a frame structure of a multi-hop relay wireless communication system according to a first embodiment of the present invention.

In order to support a relay service, using the first section 301/311, the second section 303/313, the third section 305/315 and the fourth section 307/317, the BS and RSs of the wireless communication system operate as illustrated in FIG. 4. Subframe sections in FIG. 4 are sequentially indexed regardless of the indexes of the subframe sections in FIG. 3. For example, the first section 301/311 of FIG. 3 is identical to a first section 401/411 of FIG. 4, and the fourth section 307/317 of FIG. 3 is identical to a second section 403/413 of FIG. 4. Also, the second section 303/313 of FIG. 3 is identical to a third section 405/415 of FIG. 4, and the third section 305/315 of FIG. 3 is identical to a fourth section 407/417 of FIG. 4.

FIG. 4 illustrates a communication procedure using the frame structure of the multi-hop relay wireless communication system according to a first embodiment of the present invention. In the following description, the odd-hop RSs are referred to as a first group and the even-hop RSs are referred to as a second group.

Referring to FIG. 4, the frame includes a DL subframe 400 and a UL subframe 410. The DL/UL subframe 400/410 is divided into a first section 401/411, a second section 403/413, a third section 405/415, and a fourth section 407/417 according to time resources.

In the first, second and fourth sections 401, 403 and 407 of the DL subframe 400, a BS 420 transmits DL data to MSs within its coverage. Thereafter, in the third section 405, the BS 420 transmits DL data to a 1-hop RS 430. Herein, the 1-hop RS is included in the first group.

Also, in the first, second and fourth sections 411, 413 and 417 of the UL subframe 410, the BS 420 receives UL data from the MSs. Thereafter, in the third section 415, the BS 420 receives UL data from the 1-hop RS 430.

In the first and fourth sections 401 and 407 of the DL subframe 400, the first-group RS 430 transmits DL data to MSs within its coverage. Thereafter, in the second section 403, the first-group RS 430 transmits DL data to the next-hop RS 440 included in the second group. Also, in the third section 405, the first-group RS 430 receives DL data from the previous-hop RS included in the second group. That is, the first-group RS 430 relays the data received from the BS or the upper RS in the third section 405, to the MSs in the fourth section 407. If the first-group RS 430 is a 1-hop RS, the 1-hop RS receives DL data from the BS 420 in the third section 405.

In the first and fourth sections 411 and 417 of the UL subframe 410, the first-group RS 430 receives UL data from the MSs. Thereafter, in the second section 413, the first-group RS 430 receives UL data from the next-hop RS 440 included in the second group. In the third section 415, the first-group RS 430 transmits UL data to the previous-hop RS included in the second group. Herein, if the first-group RS 430 is a 1-hop RS, the 1-hop RS transmits DL data to the BS 420 in the third section 415.

In the first and fourth sections 401 and 407 of the DL subframe 400, the second-group RS 440 transmits DL data to MSs within its coverage. Thereafter, in the second section 403, the second-group RS 440 receives DL data from the previous-hop RS 430 included in the first group. In the third section 405, the second-group RS 440 transmits DL data to the next-hop RS included in the first group. That is, the second-group RS 440 relays the data received from the upper RS in the second section 403, to the MSs in the fourth section 407.

In the first and fourth sections 411 and 417 of the UL subframe 410, the second-group RS 440 receives UL data from the MSs. Thereafter, in the second section 413, the second-group RS 440 transmits UL data to the previous-hop RS 430 included in the first group. In the third section 415, the second-group RS 440 receives UL data from the next-hop RS included in the first group.

Next, a description will be given of a method for performing communication in the wireless communication system using the subframe including three relay-service sections. In the following description, it is assumed that the second section 303/313, the fourth section 307/317, and the fifth section 309/319 are used as the three relay-service sections.

Figure 5:
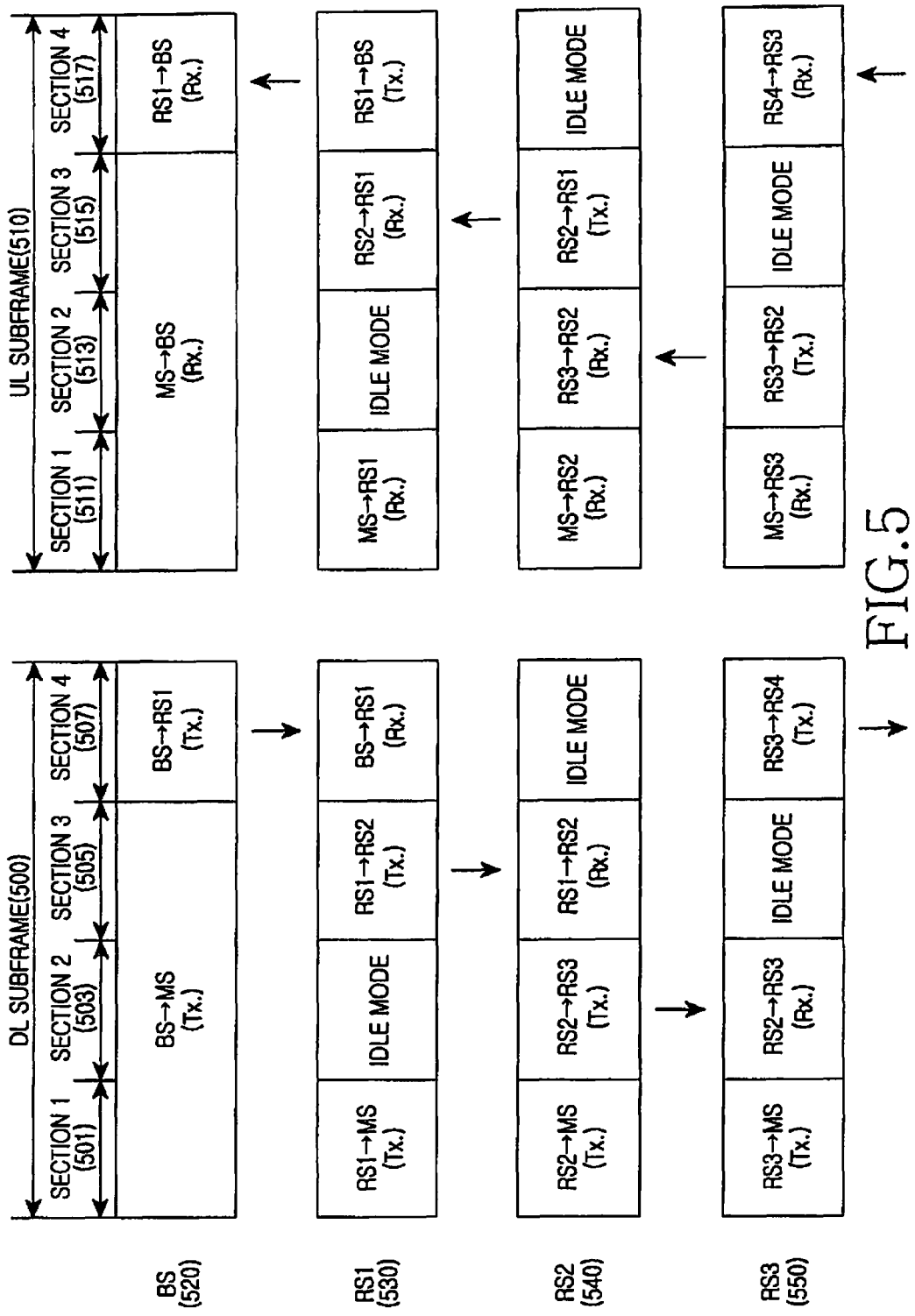
FIG. 5 illustrates a communication procedure using a frame structure of a multi-hop relay wireless communication system according to a second embodiment of the present invention.

In order to support a relay service, using the first section 301/311, the second section 303/313, the fourth section 307/317 and the fifth section 309/319, the BS and RSs of the wireless communication system operate as illustrated in FIG. 5. Subframe sections in FIG. 5 are sequentially indexed regardless of the indexes of the subframe sections in FIG. 3. For example, the first section 301/311 of FIG. 3 is identical to a first section 501/511 of FIG. 5, and the fourth section 307/317 of FIG. 3 is identical to a second section 503/513 of FIG. 5. Also, the second section 303/313 of FIG. 3 is identical to a third section 505/515 of FIG. 5, and the fifth section 309/319 of FIG. 3 is identical to a fourth section 507/517 of FIG. 5.

FIG. 5 illustrates a communication procedure using the frame structure of the multi-hop relay wireless communication system according to a second embodiment of the present invention.

Referring to FIG. 5, the frame includes a DL subframe 500 and a UL subframe 510. The DL/UL subframe 500/510 is divided into a first section 501/511, a second section 503/513, a third section 505/515, and a fourth section 507/517 according to time resources.

In the first, second and third sections 501, 503 and 505 of the DL subframe 500, a BS 520 transmits DL data to MSs within its coverage. Thereafter, in the fourth section 507, the BS 520 transmits DL data to a 1-hop RS 530 (RS1).

Also, in the first, second and third sections 511, 513 and 515 of the UL subframe 510, the BS 520 receives UL data from the MSs. Thereafter, in the fourth section 517, the BS 520 receives UL data from the first RS 530.

In the first section 501 of the DL subframe 500, the first RS 530 transmits DL data to MSs within its coverage. Thereafter, in the second section 503, the first RS 530 operates in an idle mode. That is, the first RS 530 does not provide any service in the second section 503 in order to reduce an interference with another RS.

Thereafter, the first RS 530 transmits DL data to a second RS 540 (RS2) subordinate thereto in the third section 505 and receives DL data from the BS 520 in the fourth section 507.

Also, in the first section 511 of the downlink subframe 510, the first RS 530 receives UL data from the MSs. Thereafter, in the second section 513, the first RS 530 operates in an idle mode.

Thereafter, the first RS 530 receives UL data from the second RS 540 in the third section 515 and transmits UL data to the BS 520 in the fourth section 517.

In the first section 501 of the DL subframe 500, the second RS 540 transmits DL data to MSs within its coverage. Thereafter, the second RS 540 transmits DL data to a third RS 550 subordinate thereto in the second section 503 and receives DL data from the first RS 530 superordinate thereto in the third section 505.

Thereafter, in the fourth section 507, the second RS 540 operates in an idle mode. That is, the second RS 540 does not provide any service in the fourth section 507 in order to reduce interference with another RS.

In the first section 511 of the UL subframe 510, the second RS 540 receives UL data from the MSs. Thereafter, the second RS 540 receives UL data from the third RS 550 (RS3) in the second section 513 and transmits UL data to the first RS 530 in the third section 515. Thereafter, in the fourth section 517, the second RS 540 operates in an idle mode.

In the first section 501 of the DL subframe 500, the third RS 550 transmits DL data to MSs within its coverage. Thereafter, the third RS 550 receives DL data from the second RS 540 superordinate thereto in the second section 503 and operates in an idle mode in the third section 505. That is, the third RS 550 does not provide any service in the third section 505 in order to reduce an interference with another RS.

Thereafter, in the fourth section 507, the third RS 550 transmits DL data to a fourth RS (RS4) subordinate thereto.

In the first section 511 of the UL subframe 510, the third RS 550 receives UL data from the MSs. Thereafter, the third RS 550 transmits UL data to the second RS 540 in the second section 513 and operates in an idle mode in the third section 515.

Thereafter, in the fourth section 517, the third RS 550 receives UL data from the fourth RS.

As described above, using the frame structure illustrated in FIG. 3, the wireless communication system can support a multi-hop relay service as illustrated in FIG. 4 or 5. The wireless communication system can use the frame structure selectively according to cell environment parameters (e.g., the number of hops). Thus, the upper node of the wireless communication system transmits frame information to the lower node so that all the nodes of the system (e.g., BSs, RSs, and MSs) can detect the frame structure of the system. Herein, the upper node denotes the BS or the upper RS and the lower node denotes the lower RS or the MS.

Hereinafter, a description will be given of technologies for transmitting frame information from the upper node to the lower RS in the wireless communication system. The upper node may transmit the frame information to the lower RS by using a Downlink Channel Descriptor (DCD), a Media Access Control (MAC) message, or a MAP message including an Information Element (IE) for the frame information. The following description is made on the assumption of using a MAP message to transmit the frame information from the upper node to the lower RS.

Figure 6:
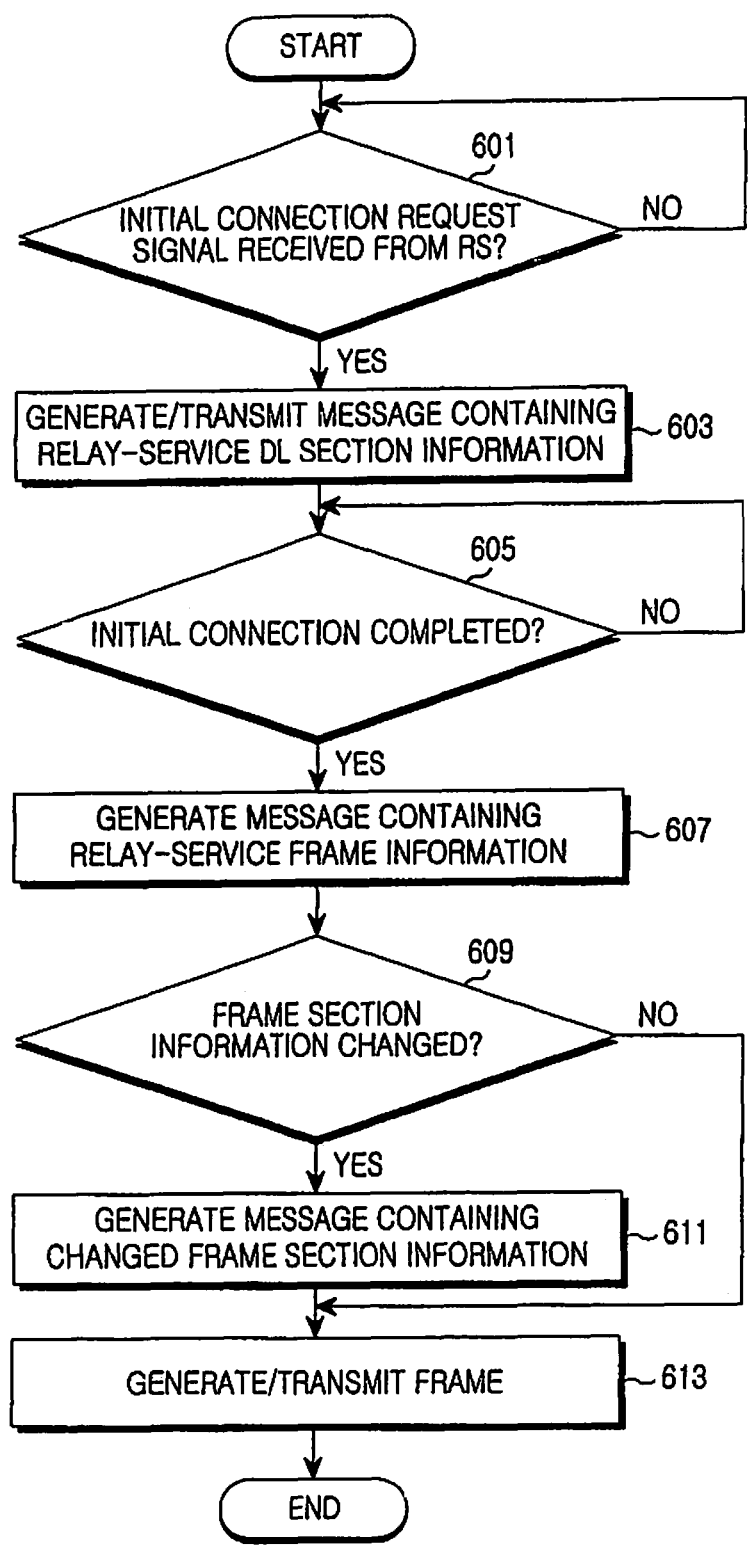
FIG. 6 illustrates a procedure for a BS to transmit frame information in a multi-hop relay wireless communication system according to the present invention.

FIG. 6 illustrates a procedure for the BS to transmit the frame information in the multi-hop relay wireless communication system according to the present invention.

Referring to FIG. 6, in step 601, the BS determines whether an initial connection request signal is received from an RS.

If the initial connection request signal is received from the RS, the procedure proceeds to step 603. In step 603, the BS generates DL-MAP containing information about a relay-service section for communication with the RS in a DL subframe. Thereafter, the BS transmits an initial connection signal containing the DL-MAP to the RS. That is, the BS performs an initial connection to the RS.

For the initial connection to the RS, the BS performs an initial connection to the RS through the first section 301 of FIG. 3. Thus, after the initial connection to the RS using the DL-MAP of the first section 301, the BS transmits information about a relay-service section for communication with the RS (e.g., the second section 303 of FIG. 3) to the RS. Herein, the BS generates DL-MAP containing information about a relay-service section for communication with the RS in the format of an STC(Space-Time Coding)_DL_ZONE_IE shown in Table 1. In this context, Table 1 contains the start information of a relay-service section for communication with the RS after the initial connection to the RS.

information about the relay-service section for communication with the RS. Thus, upon receipt of the STC_DL_ZONE_IE, the RS detects from the indicator information that the STC_DL_ZONE_IE contains information about the relay-service section for communication with the RS. At this point, MSs within the coverage of the BS detect from the indicator information that the STC_DL_ZONE_IE contains information about a section allocated to another MS.

In the above-described embodiment, the BS transmits information about a relay-service subframe section to the RS by reusing an STC-ZONE-IE defined in the Institute of Electrical and Electronics Engineers (IEEE) 802.16e as shown in Table 1.

TABLE 1

| Syntax | Size | Notes |
|---|---|---|
| STC_DL_ZONE_IE( ) | | |
| Extended DIUC | 4 bits | STC/DL_ZONE_SWITCH = 0x01 |
| Length | 4 bits | Length=0x04 |
| OFDMA symbol offset | 8 bits | Denotes the start of zone (counting from the frame preamble and starting from 0) |
| Permutation | 2 bits | 0b00 = PUSC permutation<br>0b01 = FUSC permutation<br>0b10 = Optional FUSC permutation<br>0b11 = Optional adjacent subcarrier permutation |
| Use All SC indicator | 1 bit | 0 = do not use all subchannels<br>1 = use all subchannels |
| STC | 2 bits | 0b00 = no STC<br>0b01 = STC using 2/3 antennas<br>0b10 = STC using 4 antennas<br>0b11 = FHDC using 2 antennas |
| Matrix indicator | 2 bits | STC matrix(see 8.4.8.1.4)<br>If(STC==0b01 or STC==0b10)<br>{<br>0b00 = Matrix A<br>0b01 = Matrix B<br>0b10 = Matrix C<br>0b11 = reserved<br>}<br>else if(STC==0b11)<br>{<br>0b00 = Matrix A<br>0b01 = Matrix B<br>0b10-11 = reserved<br>} |
| DL_PermBase | 5 bits | |
| PRBS_ID | 2 bits | Value: 0..2 Refer to 8.4.9.4.1 |
| AMC type | 2 bits | Indicates the AMC type in case permutation type=0b11, otherwise shall be set to 0.<br>AMC type (N×M=N bins by M symbols):<br>0b00 = 1×6<br>0b01 = 2×3<br>0b10 = 3×2<br>0b11 = reserved<br>note that only 2×3 Band AMC subchannel type (AMC type=0b01) is supported by MS. |
| Midamble presence | 1 bit | 0 = not present<br>1 = present at the first symbol in STC zone |
| Midamble boosting | 1 bit | 0 = no boost<br>1 = boosting (3 dB) |
| 2/3 antennas select | 1 bit | 0 = STC using 2 antennas<br>1 = STC using 3 antennas<br>selects 2/3 antennas when STC=0b01 |
| Dedicated pilots | 1 bit | 0 = pilot symbols are broadcast<br>1 = pilot symbols are dedicated. An MS should use only pilots specific to its burst for channel estimation |
| Indicator | 1 bit | 1=enable to indicate relay region of the previous relay link |
| reserved bit | 3 bits | set to zero |

Herein, the STC_DL_ZONE_IE contains information about an OFDMA symbol offset for indicating the start point of a relay-service section for communication with the RS initially connected by the BS, and information about an indicator for indicating that the STC_DL_Zone_IE contains In another embodiment, the BS transmits information about a relay-service subframe section to the RS by using a new message defined as shown Table 2. In this case, the BS can generate a DL message as well as a DL message. In this context, Table 2 contains information about a relay-service DL section for communication with the RS after the initial connection to the RS.

TABLE 2

| LOGIC | Notes |
|---|---|
| Frame Number to take effect; Number of zone (K); for I=1:K   zone transceiver mode;   OFDMA Symbol Offset;   Duration;   amble present;   FCH/MAP present; end | zone transceiver mode: (TX/RX) or (TX/RX/IDLE MODE) |

Herein, a message for transmitting the frame information contains 'Frame Number' information for indicating a frame starting communication using the frame information contained in the message, 'Number of Zone' information for indicating the number of sections contained in the UL/DL subframe, 'Zone Transceiver Mode' information for indicating a method of operating a relay-service section in the UL/DL subframe, 'OFDMA Symbol Offset' information for indicating the start point of the relay-service section, 'Duration' information for indicating the length of the relay-service section, 'Amble Present' information for indicating whether a synch channel is included in the relay-service section, and 'FCH/MAP Present' information for indicating whether a control message (i.e., a Frame Control Header and map) is included in the relay-service section.

In Table 2, the 'Zone Transceiver Mode' information may include information about a TX mode, an RX mode or an idle mode in order to indicate the operations of the BS and the RS in the relay-service section.

Thereafter, in step 605, the BS determines whether the initial connection with the RS is completed.

If the initial connection with the RS is completed, the procedure proceeds to step 607. In step 607, the BS generates a MAP message containing frame information for a relay service. Thereafter, the BS transmits the MAP message to the RS through a relay-service section for communication with the RS.

If the wireless communication system uses two hops, the BS generates an RS UL MAP message containing UL subframe section information for communication with the RS for a relay service. For example, the BS generates an RS UL MAP message containing information about the second section 313 of FIG. 3. Herein, the BS generates the RS UL MAP message containing the UL section information in the format of a UL-ZONE-IE shown in Table 3.

TABLE 3

| Syntax | Size | Notes |
|---|---|---|
| UL_ZONE_IE( ) | | |
| Extended DUIUC | 4 bits | UL_ZONE = 0x04 DUIUC(DL/UL Interval Usage Code) |
| Length | 4 bits | Length = 0x03 |
| OFDMA symbol offset | 7 bits | |
| Permutation | 2 bits | 0b00 = PUSC permutation 0b01 = PUSC permutation 0b10 = Optional PUSC permutation 0b01 = Optional PUSC permutation 0b1110 = Adjacent subcarrier permutation 0b11 = Reserved PUSC(Partial Usage of SubCarrier) |

TABLE 3-continued

| Syntax | Size | Notes |
|---|---|---|
| PUSC UL_IDcellPermBase | 7 bits | |
| AMC type | 2 bits | Indicates the AMC type in case permutation type = 0b10, otherwise shall be set to 0. AMC type(N×M = N bins by M symbols): 0b00 - 1x6 0b01 - 2x3 0b10 - 3x2 0b11 - Reserved |
| Use All SC indicator | 1 bit | 0 = Do not use all subchannels 1 = Use all subchannels |
| Reserved | 5 bits | Shall be set to zero |

Herein, the UL_ZONE_IE contains 'OFDMA Symbol Offset' information for indicating the start point of a section that is used for the BS to communicate with the RS for a relay service.

In the above-described embodiment, the BS transmits information about a relay-service subframe section to the RS by reusing a UL-ZONE-IE defined in the IEEE 802.16e as shown in Table 3. In another embodiment, the BS transmits information about a relay-service subframe section to the RS by using a new message defined as shown Table 2.

Thereafter, the BS transmits the generated UL MAP message to the RS through a relay-service section for communication with the RS.

If the wireless communication system uses three or more hops, the BS generates a MAP message containing UL/DL subframe section information for communication with the RS for a relay service. For example, if the RS communicates with the lower RS using the fourth section 307 or the fifth section 309 of FIG. 3, the BS transmits information about the fourth section 307 or the fifth section 309 to the RS using the RS DL MAP of the second section 303. Herein, the RS DL MAP is constructed as shown in Table 1 or Table 2.

Also, the BS generates an RS UL MAP containing UL subframe section information for communication with the RS for a relay service and UL subframe section information for communication with the lower RS. Herein, the RS UL MAP is constructed as shown in Table 2 or Table 3.

Thereafter, the BS transmits the DL MAP and the UL MAP to the RS through a section for communication with the RS for the relay service.

The BS communicates with the RS using the relay-service section information transmitted in step 607. In step 609, the BS determines whether the subframe section information is changed.

If the subframe section information is changed (step 609), the procedure proceeds to step 611. In step 611, the BS generates a message containing the changed subframe section information. For example, the BS generates a MAP message containing the changed subframe section information in the format of an Information Element (IE). In another embodiment, the BS generates a Relay-Frame Control Header (R-FCH) containing the changed subframe section information. In still another embodiment, the BS generates a MAC message or a Downlink Channel Descriptor (DCD) message containing the changed subframe section information.

In step 613, the BS generates and transmits a subframe of a section for communication with the RS, including the message containing the changed information, to the RS. Thereafter, the BS provides a relay service through the RS using the frame structure changed at the frame change time.

However, if the subframe section information is not changed (step 609), the procedure proceeds to step 613, where the BS generates a frame and communicates with the RS.

Thereafter, the procedure is ended.

Figure 7:
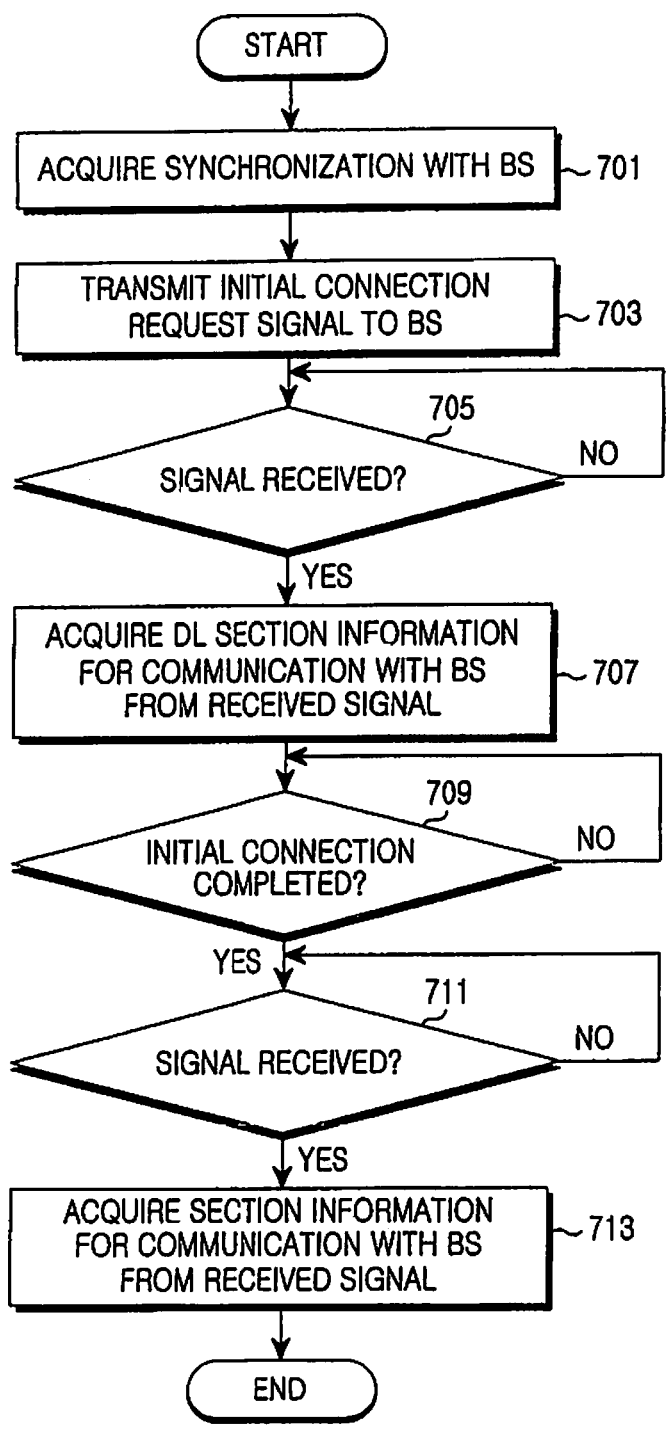
FIG. 7 illustrates a procedure for an RS to receive frame information from a BS in a multi-hop relay wireless communication system according to the present invention.

FIG. 7 illustrates a procedure for the RS to receive the frame information from the BS in the multi-hop relay wireless communication system according to the present invention.

Referring to FIG. 7, in step 701, the RS acquires synchronization with the BS through a sync channel broadcast by the BS.

In step 703, the RS transmits an initial connection request signal to the BS. For example, the RS transmits the initial connection request signal to the BS through the first section 301 of FIG. 3.

In step 705, the RS determines whether an initial connection signal is received from the BS.

If the initial connection is received from the BS, the procedure proceeds to step 707, where the RS detects DL subframe section information, which is used to receive data for a relay service from the BS after the initial connection, from the DL-MAP contained in the received signal. For example, the RS detects information about the second section 303, which is used to communicate with the BS for a relay service after the initial connection, from the DL-MAP received through the first section 301 of FIG. 3.

In step 709, the RS determines whether the initial connection with the BS is completed.

If the initial connection with the BS is completed, the procedure proceeds to step 711, where the RS determines whether a signal is received from the BS through a relay-service section for communication with the BS. For example, the RS determines whether a signal is received from the BS through the second section 303 of FIG. 3.

If the signal is received from the BS, the procedure proceeds to step 713, where the RS acquires UL/DL subframe section information for communication with the BS for a relay service from the received signal. For example, the RS acquires DL subframe section (e.g., the second section 303) information for communication with the BS for a relay service from an RS frame control header contained in the received signal. In another embodiment, the RS acquires DL subframe section information for communication with the BS for a relay service from an RS DL MAP. At this point, the RS can also acquire DL subframe section information for communication with the lower RS from the RS DL MAP.

Also, the RS acquires UL subframe section information for communication with the BS and UL subframe section information for communication with the lower RS for a relay service, from an RS UL MAP.

In still another embodiment, the RS acquires subframe section information for communication with the BS and subframe section information for communication with the lower RS for a relay service, from a MAC message or a DCD message.

After acquiring the frame information for a relay service, the RS uses the acquired frame information to perform a relay service from the start frame according to the start frame information received from the BS.

Thereafter, the procedure is ended.

Figure 8:
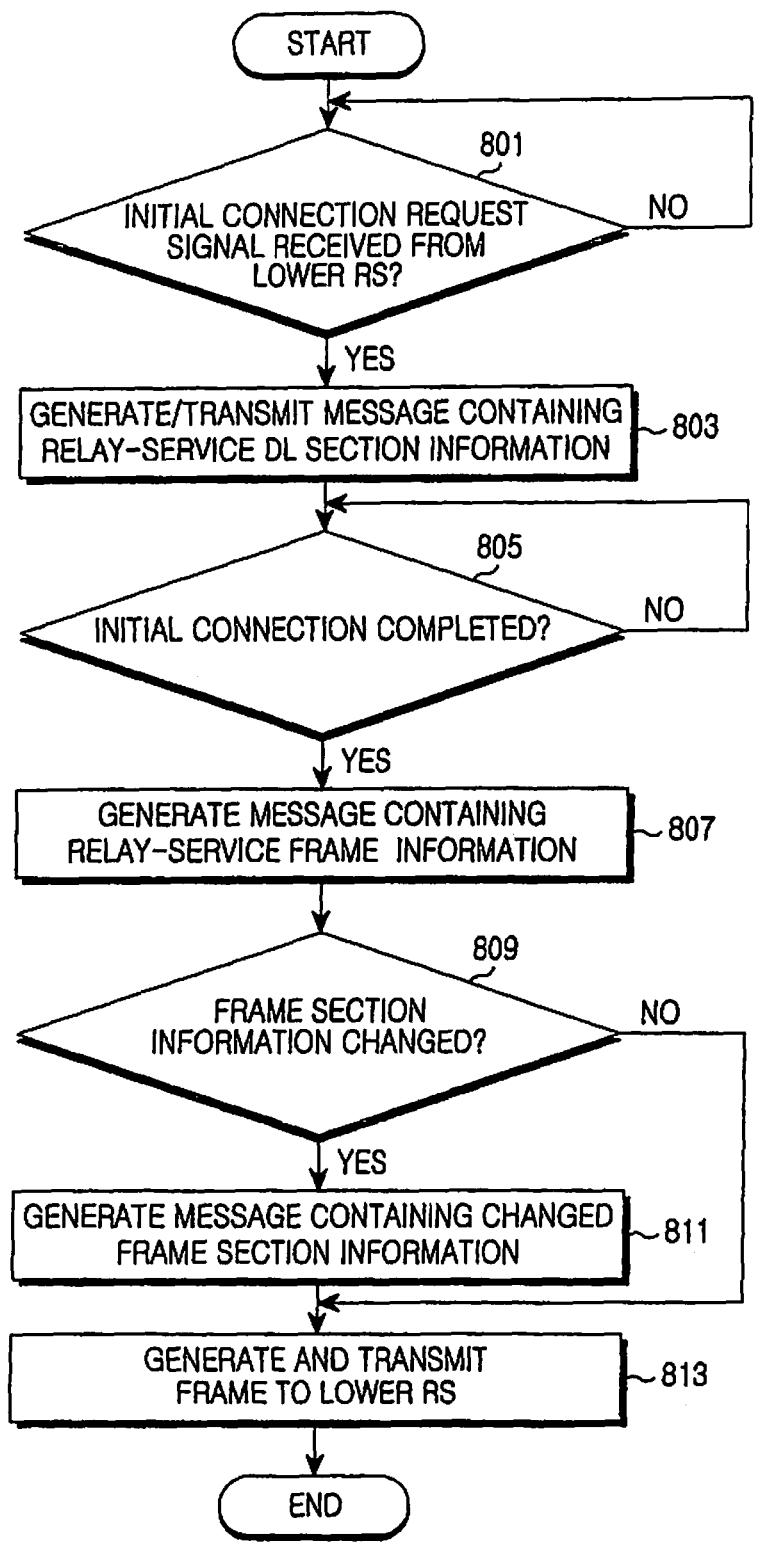
FIG. 8 illustrates a procedure for an upper RS to transmit frame information to a lower RS in a multi-hop relay wireless communication system according to the present invention.

FIG. 8 illustrates a procedure for the upper RS to transmit frame information to the lower RS in the multi-hop relay wireless communication system according to the present invention.

Referring to FIG. 8, in step 801, the upper RS determines whether an initial connection request signal is received from the lower RS.

If the initial connection request signal is received from the lower RS, the procedure proceeds to step 803, where the upper RS generates DL-MAP containing information about a relay-service section for communication with the lower RS in a DL subframe. Thereafter, the upper RS transmits an initial connection signal containing the DL-MAP to the RS. That is, the upper RS performs an initial connection to the lower RS.

For the initial connection to the lower RS, the upper RS performs an initial connection to the lower RS through the first section 301 of FIG. 3. Thus, after the initial connection to the lower RS using the DL-MAP of the first section 301, the upper RS transmits information about a relay-service section for communication with the lower RS (e.g., the fourth section 307 or the fifth section 309) to the lower RS. Herein, the upper RS generates a control message containing information about a relay-service section for communication with the lower RS in the format as shown in Table 1 or Table 2, and transmits the generated control message to the lower RS.

Thereafter, in step 805, the upper RS determines whether the initial connection with the lower RS is completed.

If the initial connection with the lower RS is completed, the procedure proceeds to step 807, where the upper RS generates a MAP message containing frame information for a relay service. Thereafter, the upper RS transmits the MAP message to the lower RS through a relay-service section for communication with the lower RS. For example, the upper RS generates an RS DL MAP containing DL subframe section information for communication with the lower RS for a relay service. Herein, the RS DL MAP is constructed in the format as shown in Table 1 or Table 2. The RS DL MAP may further contain DL section information for communication with another lower RS subordinate thereto.

Also, the upper RS generates an RS UL MAP containing UL subframe section information for communication with the lower RS for a relay service. Herein, the RS UL MAP is constructed in the format as shown in Table 2 or Table 3. The RS UL MAP may further contain UL section information for communication with another lower RS subordinate thereto.

In step 809, the upper RS determines whether the subframe section information is changed.

If the subframe section information is changed (step 809), the procedure proceeds to step 811, where the upper RS generates a message containing the changed subframe section information. For example, the upper RS generates a MAP message containing the changed subframe section information in the format of an Information Element (IE). In another embodiment, the upper RS generates an R-FCH containing the changed subframe section information. In still another embodiment, the upper RS generates a MAC message or a DCD message containing the changed subframe section information.

In step 813, the upper RS generates and transmits a subframe of a section for communication with the lower RS, including the message containing the changed information, to the lower RS. Thereafter, the upper RS provides a relay service through the lower RS using the frame structure changed at the frame change time.

However, if the subframe section information is not changed (step 809), the procedure proceeds to step 813, where the upper RS generates a frame and communicates with the lower RS.

Thereafter, the procedure is ended.

Figure 9:
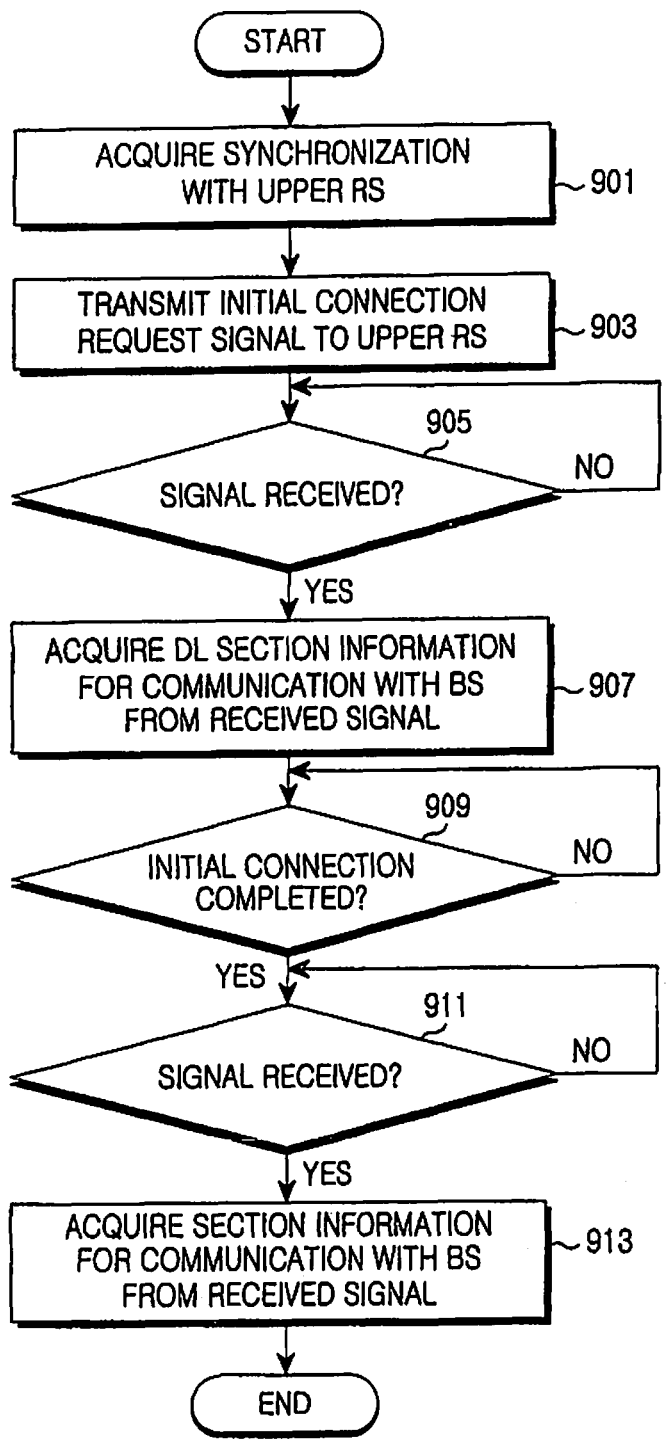
FIG. 9 illustrates a procedure for a lower RS to receive frame information from an upper RS in a multi-hop relay wireless communication system according to the present invention.

FIG. 9 illustrates a procedure for the lower RS to receive frame information from the upper RS in the multi-hop relay wireless communication system according to the present invention.

Referring to FIG. 9, in step 901, the lower RS acquires synchronization with the upper RS through a sync channel broadcast by the upper RS.

In step 903, the lower RS transmits an initial connection request signal to the upper RS. At this point, the lower RS communicates with the upper RS through the first section 301 of FIG. 3.

In step 905, the lower RS determines whether an initial connection signal is received from the upper RS. If it is received, the procedure proceeds to step 907, where the lower RS acquires DL subframe section information, which is used to receive data for a relay service from the upper RS after the initial connection, from the DL-MAP contained in the received signal. For example, the RS acquires information about the fourth section 307 or the fifth section 309, from the DL-MAP contained in the received signal in the format as shown in Table 1 or Table 2. If the RS is a 3-hop RS, the RS acquires information about the second section 303 from the frame structure of FIG. 3.

In step 909, the lower RS determines whether the initial connection with the upper RS is completed.

If the initial connection with the upper RS is completed, the procedure proceeds to step 911, where the lower RS determines whether a signal is received from the upper RS through a relay-service section for communication with the upper RS.

If the signal is received from the upper RS, the procedure proceeds to step 913, where the lower RS detects UL/DL subframe section information for communication with the upper RS for a relay service from the received signal. For example, the lower RS detects DL subframe section (e.g., the fourth section 307 or the fifth section 309) information for communication with the upper RS for a relay service from an RS frame control header contained in the received signal. In another embodiment, the lower RS detects DL subframe section information for communication with the upper RS for a relay service from an RS DL MAP. At this point, the lower RS can also detect DL subframe section information for communication with the lower RS from the RS DL MAP.

Also, the RS detects UL subframe section information for communication with the upper RS and UL subframe section information for communication with the lower RS for a relay service, from an RS UL MAP. Herein, the subframe section for the RS to communicate with the lower RS may be identical to a section for the upper RS to communicate with another upper RS superordinate to the upper RS.

In still another embodiment, the RS acquires subframe section information for communication with the upper RS and subframe section information for communication with the lower RS for a relay service, from a MAC message or a DCD message.

After acquiring the frame information for a relay service, the lower RS uses the acquired frame information to perform a relay service from the start frame according to the start frame information received from the upper RS.

Thereafter, the procedure is ended.

In the above-described embodiment, the BS or the upper RS transmits the section information for a relay service to the lower RS. At the initial connection of the lower RS, the BS or the upper RS transmits information about the start point and the length of the relay-service section to the lower RS by using the DL-MAP of a section for communication with an MS.

In another embodiment, at the initial connection of the lower RS, the BS or the upper RS provides information about only the start point of the relay-service section to the lower RS by using the DL-MAP. After the initial connection, the BS or the upper RS can provide information about the length of the relay-service section to the lower RS by using the relay-service section control message (e.g., RS DL MAP).

Thus, at the initial connection, the lower RS acquires only the start point information of the relay-service section from the BS or the upper RS. After the initial connection, the lower RS can acquire the length information of the relay-service section through the RS DL MAP according to the start point information. Herein, the RS DL MAP may contain the start point information of the relay-service section in the next frame.

Hereinafter, a description will be given of the block diagrams of the BS and the RS for transmitting the frame information in the wireless communication system. The BS and the RS have the same block diagram and thus only the block diagram of the RS will be described.

Figure 10:
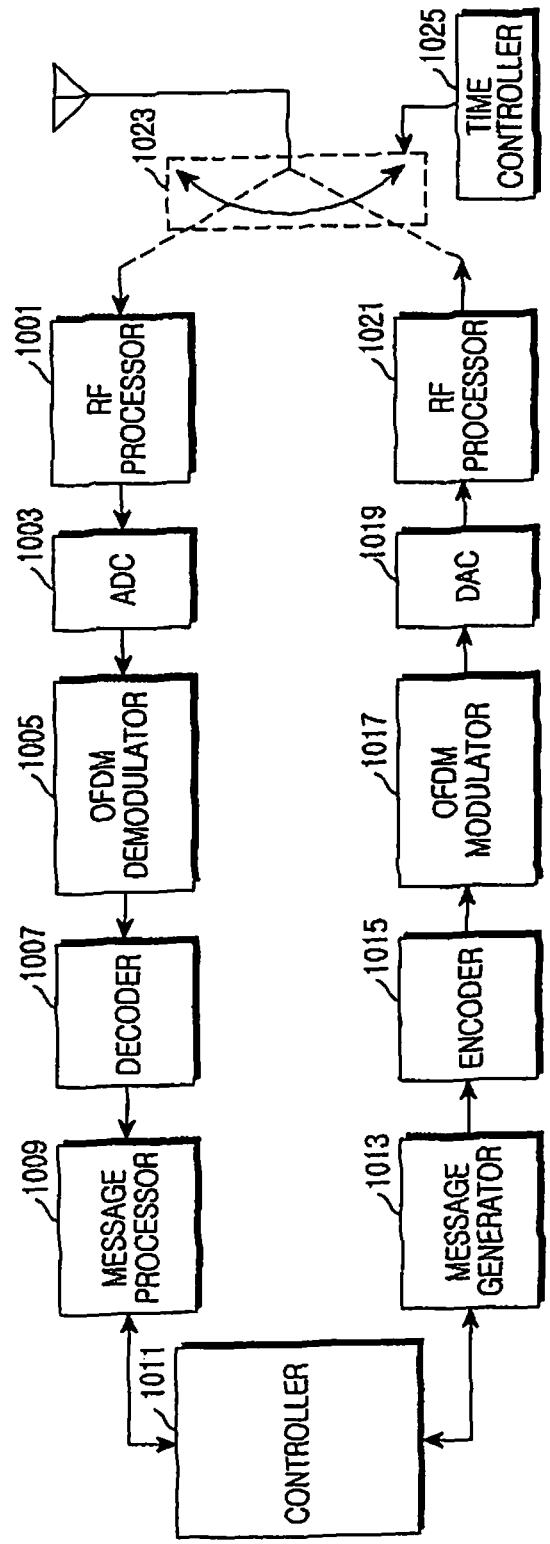
FIG. 10 illustrates an RS in a multi-hop relay wireless communication system according to the present invention.

FIG. 10 illustrates the RS in the multi-hop relay wireless communication system according to the present invention.

Referring to FIG. 10, the RS includes a Receiving (RX) Radio Frequency (RF) processor 1001, an Analog-to-Digital Converter (ADC) 1003, an Orthogonal Frequency Division Multiplexing (OFDM) demodulator 1005, a decoder 1007, a message processor 1009, a controller 1011, a message generator 1013, an encoder 1015, an OFDM modulator 1017, a Digital-to-Analog Converter (DAC) 1019, a Transmitting (TX) RF processor 1021, a switch 1023, and a time controller 1025.

The time controller 1025 controls a switching operation of the switch 1023 based on frame synchronization. For example, in an RX section of a frame, the time controller 1025 controls the switch 1023 so that an antenna is connected to the RX RF processor 1001. In a TX section of the frame, the time controller 1025 controls the switch 1023 so that the antenna is connected to the TX RF processor 1021.

In the RX section of the frame, the RX RF processor 1001 converts an RF signal received through the antenna into a baseband analog signal. The ADC 1003 samples the analog signal received from the RX RF processor 1001 so as to convert the analog signal into a sampled data (digital signal). The OFDM demodulator 1005 Fast Fourier Transform (FFT)-processes the sampled data to output frequency-domain data.

The decoder 1007 selects data of desired subcarriers from the frequency-domain data. The decoder 1007 demodulates and decodes the selected data at a predetermined Modulation and Coding Scheme (MCS) level.

The message processor 1009 processes a control message from the decoder 1007 and provides the results of the processing to the controller 1011. For example, at the initial connection, the message processor 1009 provides the controller 1011 with the DL MAP containing the frame information from the control message received from the BS or the upper RS. Also, after the initial connection, the message processor 1009 provides the controller 1011 with the control message (R-FCH, R-DL-MAP or R-UL-MAP) containing the frame information from the control message received from the BS or the upper RS through the section for the relay service.

The controller 1011 acquires frame information by analyzing the information received from the message processor 1009. For example, at the initial connection, the controller 1011 acquires the start information of the DL section for communication with the BS or the upper RS for the relay service from the DL MAP. After the initial connection, the controller 1011 acquires the frame information for communication with the BS or the upper RS for the relay service from the control message received through the relay-service section. Also, the controller 1011 acquires the frame information for communication with the lower RS from the control message received through the relay-service section.

In the TX section, the message generator 1013 generates a message using various information received from the controller 1011 and provides the message to the encoder 1015 of a physical layer. For example, the message generator 1013 generates the DL MAP containing the subframe section information for communication with the RS after the initial connection of the lower RS, at the initial connection with the lower RS for provision of the frame information to the lower RS. After the initial connection, the message generator 1013 generates the control message containing the frame information for the lower RS to communicate with the RS for the relay service.

The encoder 1015 encodes and modulates the message received from the message generator 1013 according to an MCS level. The OFDM modulator 1017 Inverse Fast Fourier Transform (IFFT)-processes data received from the encoder 1015, to output sampled data (OFDM symbols). The DAC 1023 converts the sampled data into an analog signal. The TX RF processor 1021 converts the baseband analog signal received from the DAC 1023 into an RF signal that it transmits through the antenna.

Except the message generator 1013 among the modules for executing the operations of the RX/TX sections, all the modules of the BS operate in the same fashion as those of the RS.

The message generator 1013 generates the message for transmission of the frame information to the RS. For example, at the initial connection, the message generator 1013 generates the DL MAP containing the DL subframe section information for communication with the RS for the relay service after the initial connection.

After the initial connection, the message generator 1013 generates the control message containing the frame information for communication with the RS for the relay service. That is, the message generator 1013 generates the RS frame header (R-FCH) containing the DL subframe section information for communication with the RS for the relay service in the next frame. Also, the message generator 1013 generates the RS UL MAP containing the UL subframe section information for communication with the RS for the relay service. If the wireless communication system uses three or more hops, the message generator 1013 generates the RS DL MAP containing the DL subframe section information for the RS to communicate with the lower RS. Also, the message generator 1013 generates the RS UL MAP containing the UL subframe section information for the RS to communicate with the lower RS.

Herein, the control messages for transmitting the frame information from the RS or the upper RS to the lower RS for the relay service contain the subframe section information contained in the above control message and the location information of the sync channel contained in the subframe section.

In the above-described embodiment, the BS or the upper RS constructs the MAP containing the relay-service section information in the format of an information element, and transmits the constructed MAP to the lower RS. In another embodiment, when the BS or the upper RS transmits the relay-service section information using the MAC message or the DCD message, it may construct the MAC message or the DCD message in the format as shown in Table 2.

As described above, the present invention transmits and detects the relay-service section information in the multi-hop wireless communication system depending on the cell environment parameter, thereby making it possible to construct the frame adaptively according to the cell environment parameter and to decode the corresponding frame information accurately according to the constructed frame information.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An upper node in a wireless communication system using a relay scheme, the upper node comprising:
   a receiver configured to receive a request of a lower relay station for an initial connection of the lower relay station; and
   a transmitter configured to transmit, during an initial connection procedure, downlink sub-frame configuration information,
   wherein the downlink sub-frame configuration information comprises a number of zones indicating a number of sections included in a downlink sub-frame and per-zone configuration information, and
   wherein the per-zone configuration information comprises at least one of a transceiver mode indicating one of a transmission (TX) mode, a reception (RX) mode, and an idle mode in each zone, a symbol offset indicating a start point of each zone, and a duration starting from the symbol offset.

2. The upper node of claim 1, further comprising a processor configured to generate a first control message indicating the downlink sub-frame configuration information, the first control message comprising one of a Downlink Channel Descriptor (DCD), a Media Access Control (MAC) message, and a Media Access Protocol (MAP) message including the downlink sub-frame configuration information in a format of an information element,
   wherein the transmitter is further configured to transmit the first control message to the lower relay station.

3. The upper node of claim 2, wherein the first control message further comprises at least one of Orthogonal Frequency Division Multiple Access (OFDMA) symbol information for starting a downlink sub-frame zone for communication with the lower relay station for a relay service, OFDMA symbol length information of the downlink sub-frame section, TX/RX mode information for indicating in which one of a TX mode, an RX mode, and an idle mode the lower relay station operates in the downlink sub-frame zone, information for indicating whether a control message is included in the downlink sub-frame zone, information for indicating whether a synchronization channel is included in the downlink sub-frame zone, frame number information for the lower relay station to start communication through the downlink sub-frame zone, and position information of the synchronization channel included in the downlink sub-frame zone.

4. The upper node of claim 1, wherein the upper node comprises a base station or an upper relay station.

5. The upper node of claim 1, further comprising a processor configured to generate a second control message indicating uplink sub-frame configuration information for communication with the lower relay station of a relay service, the second control message comprising one of a Downlink Channel Descriptor (DCD), a Media Access Control (MAC) message, and a Media Access Protocol (MAP) message including the uplink sub-frame configuration information in a format of an information element, wherein the transmitter is further configured to transmit the second control message to the lower relay station.

6. The upper node of claim 5, wherein the second control message further comprises at least one of Orthogonal Frequency Division Multiple Access (OFDMA) symbol information for starting an uplink sub-frame zone for communication with the lower relay station and an uplink sub-frame zone for the lower relay station to communicate with another lower relay station subordinate to the lower relay station, OFDMA symbol length information of the uplink sub-frame zones, TX/RX mode information for indicating in which one of a TX mode, an RX mode, and an idle mode the lower relay station operates in the uplink sub-frame zones, information for indicating whether a control message is included in the uplink sub-frame zones, information for indicating whether a synchronization channel is included in the uplink sub-frame zones, frame number information for the lower relay station to start communication using the uplink sub-frame configuration information, and position information of the synchronization channel included in the uplink sub-frame zones.

7. The upper node of claim 5, wherein the processor is further configured to generate a third control message indicating downlink sub-frame configuration information for the lower relay station to communicate with another lower relay station subordinate to the lower relay station for a relay service, the third control message comprising one of a DCD, a MAC message, and a MAP message including the downlink sub-frame configuration information in a format of an information element.

8. The upper node of claim 7, wherein the third control message further comprises at least one of Orthogonal Frequency Division Multiple Access (OFDMA) symbol information for starting a downlink sub-frame zone for the lower relay station to communicate with another lower relay station subordinate to the lower relay station, OFDMA symbol length information of the downlink sub-frame zone, TX/RX mode information for indicating in which one of a TX mode, an RX mode, and an idle mode the lower relay station operates in the downlink sub-frame zone, information for indicating whether a control message is included in the downlink sub-frame zone, information for indicating whether a synchronization channel is included in the downlink sub-frame zone, frame number information for the lower relay station to start communication using the downlink sub-frame configuration information, and position information of the synchronization channel included in the downlink sub-frame zone.

9. The upper node of claim 1, further comprising a processor configured to generate, if a subframe configuration for the lower relay station is changed, a fourth control message including changed information of a structure of subframes, wherein the transmitter is further configured to transmit the fourth control message to the lower relay station.

10. The upper node of claim 9, wherein the fourth control message includes the changed information of the structure of the subframes in a format of one of a frame control header, a MAP message including downlink sub-frame configuration information in a format of an information element, a Media Access Control (MAC) message, and a Downlink Channel Descriptor (DCD).

11. The upper node of claim 9, wherein the fourth control message further includes position information of the synchronization channel.

12. A relay station in a wireless communication system using a relay scheme, the relay station comprising:

a transceiver configured to transmit a request for an initial connection to an upper node; and a receiver configured to receive, during an initial connection procedure, downlink sub-frame configuration information, wherein the downlink sub-frame configuration information comprises a number of zones indicating a number of sections included in a downlink sub-frame and per-zone configuration information, and wherein the per-zone configuration information comprises at least one of a transceiver mode indicating one of a transmission (TX) mode, a reception (RX) mode, and an idle mode in each zone, a symbol offset indicating a start point of each zone, and a duration starting from the symbol offset.

13. The relay station of claim 12, wherein the upper node comprises a base station or an upper relay station.

14. The relay station of claim 12, further comprising a processor configured to acquire the downlink sub-frame configuration information from a first control message, wherein the downlink sub-frame configuration information indicates at least one sub-frame zone used to communicate with the upper node, and wherein the first control message comprises one of a Downlink Channel Descriptor (DCD), a Media Access Control (MAC) message, and a Media Access Protocol (MAP) message including the downlink sub-frame configuration information in a format of an information element.

15. The relay station of claim 14, wherein the first control message further comprises at least one of Orthogonal Frequency Division Multiple Access (OFDMA) symbol information for starting the downlink sub-frame zone for communication with the upper node for a relay service, OFDMA symbol length information of the downlink sub-frame zone, TX/RX mode information for indicating in which one of a TX mode, an RX mode, and an idle mode the relay station operates in the downlink sub-frame zone, information for indicating whether a control message is included in the downlink sub-frame zone, information for indicating whether a synchronization channel is included in the downlink sub-frame zone, frame number information for the lower relay station to start communication through the downlink sub-frame zone, and position information of the synchronization channel included in the downlink sub-frame zone.

16. The relay station of claim 12, wherein the receiver is further configured to receive a second control message comprising uplink sub-frame configuration information, wherein the uplink sub-frame configuration information indicates at least one uplink sub-frame zone used to communicate with the upper node and at least one uplink sub-frame zone used to communicate with a lower relay station, and wherein the second control message comprises one of a Downlink Channel Descriptor (DCD), a Media Access Control (MAC) message, and a Media Access Protocol (MAP) message including the uplink sub-frame configuration information in a format of an information element.

17. The relay station of claim 16, wherein the second control message further comprises at least one of Orthogonal Frequency Division Multiple Access (OFDMA) symbol information for starting an uplink sub-frame zone for communication with the upper node and an uplink sub-frame for communication with the lower relay station, OFDMA symbol length information of the uplink sub-frame zones, TX/RX mode information for indicating in which one of a TX mode, an RX mode, and an idle mode the relay station operates in the uplink sub-frame zones, information for indicating whether a control message is included in the uplink sub-frame zones, information for indicating whether a synchronization channel is included in the uplink sub-frame zones, frame number information for the lower relay station to start communication using the uplink sub-frame configuration information, and position information of the synchronization channel included in the uplink sub-frame zones.

18. The relay station of claim 16, wherein the receiver is further configured to receive a third control message comprising downlink sub-frame configuration information,
   wherein the downlink sub-frame configuration information indicates at least one downlink sub-frame zone used to communicate with a lower relay station, and
   wherein the third control message comprises one of a Downlink Channel Descriptor (DCD), a Media Access Control (MAC) message, and a Media Access Protocol (MAP) message including the downlink sub-frame configuration information in a format of an information element.

19. The relay station of claim 18, wherein the third control message further comprises at least one of Orthogonal Frequency Division Multiple Access (OFDMA) symbol information for starting a downlink sub-frame zone for communication with the lower relay station, OFDMA symbol length information of the downlink sub-frame zone, TX/RX mode information for indicating in which one of a TX mode, an RX mode, and an idle mode the lower relay station operates in the downlink sub-frame zone, information for indicating whether a control message is included in the downlink sub-frame zone, information for indicating whether a synchronization channel is included in the downlink sub-frame zone, frame number information for the lower relay station to start communication using the downlink sub-frame configuration information, and position information of the synchronization channel included in the downlink sub-frame zone.

20. The relay station of claim 12, wherein the receiver is further configured to receive a fourth control message from the upper node,
   wherein the fourth control message comprises one of a frame control header, a Media Access Protocol (MAP) message including downlink sub-frame configuration information in a format of an information element, a Media Access Control (MAC) message, and a Downlink Channel Descriptor (DCD), and
   wherein the relay station further comprises a processor configured to detect, if the fourth control message is received, changed information of a structure of subframes of a frame used to communicate with the upper node from the fourth control message.

21. An upper node in a wireless communication system using a relay scheme, the upper node comprising:
   a processor configured to generate a control message indicating uplink sub-frame configuration information for communication with a lower relay station for a relay service, the control message including one of a Downlink Channel Descriptor (DCD), a Media Access Control (MAC) message, and a Media Access Protocol (MAP) message including the uplink sub-frame configuration information in a format of an information element; and
   a transceiver configured to transmit the control message to the lower relay station and communicate with the lower relay station using the uplink sub-frame configuration information transmitted to the lower relay station,
   wherein the uplink sub-frame configuration information comprises a number of zones indicating a number of sections included in an uplink sub-frame and per-zone configuration information, and
   wherein the per-zone configuration information comprises at least one of a transceiver mode indicating one of a transmission (TX) mode, a reception (RX) mode, and an idle mode in each zone, a symbol offset indicating a start point of each zone, and a duration starting from the symbol offset.

22. The upper node of claim 21, wherein the control message further includes at least one of Orthogonal Frequency Division Multiple Access (OFDMA) symbol offset information for starting an uplink sub-frame zone for communication with the lower relay station and an uplink sub-frame zone for the lower relay station to communicate with another lower relay station subordinate to the lower relay station, OFDMA symbol length information of the uplink sub-frame zones, TX/RX mode information for indicating in which one of a TX mode, an RX mode, and an idle mode the lower relay station operates in the uplink sub-frame zones, information for indicating whether a control message is included in the uplink sub-frame zones, information for indicating whether a synchronization channel is included in the uplink sub-frame zones, frame number information for the lower relay station to start communication using the uplink sub-frame configuration information, and position information of the synchronization channel included in the uplink sub-frame zones.

* * * * *